United States Patent
Junius et al.

(10) Patent No.: US 6,286,800 B1
(45) Date of Patent: *Sep. 11, 2001

(54) NOTE PAPER HOLDER

(76) Inventors: Tristan P. Junius; Khathrinah Russ Bliss, both of 3426 Lincoln Blvd., Omaha, NE (US) 68131

( * ) Notice: Subject to any disclaimer, the term of this patent is extended or adjusted under 35 U.S.C. 154(b) by 0 days.

This patent is subject to a terminal disclaimer.

(21) Appl. No.: 08/364,665

(22) Filed: Dec. 27, 1994

(51) Int. Cl.[7] .................................................. B41J 11/02
(52) U.S. Cl. ..................... 248/442.2; 40/658; 248/451; 248/918
(58) Field of Search ................ 248/442.2, 447.1, 248/451, 453, 316.2, 316.3, 918; 40/658, 642; 211/89, 120

(56) References Cited

U.S. PATENT DOCUMENTS

| | | | |
|---|---|---|---|
| 1,894,974 | * | 1/1933 | Bleckley ................................ 211/89 |
| 2,304,795 | * | 12/1942 | Bricker ................................ 248/453 |
| 2,418,433 | * | 4/1947 | Solem ................................ 248/442.2 |
| 2,603,352 | * | 7/1952 | Zakos ................................ 40/658 X |
| 3,565,262 | * | 2/1971 | Sasolla ................................ 211/120 |
| 3,863,882 | * | 2/1975 | Hatcher ................................ 248/453 |
| 4,010,517 | * | 3/1977 | Kapstad ............................. 211/89 X |
| 4,089,116 | * | 5/1978 | Bearinger ........................... 40/658 X |
| 4,105,127 | * | 8/1978 | Holl ................................... 211/89 X |
| 4,125,243 | * | 11/1978 | Liptak ................................ 70/658 X |
| 4,545,489 | * | 10/1985 | Welch ............................... 211/120 X |
| 4,600,110 | * | 7/1986 | Timor ................................ 211/120 |
| 4,629,075 | * | 12/1986 | Hatten ................................ 211/89 |
| 4,773,545 | * | 9/1988 | Jones ................................ 211/89 |
| 5,104,088 | * | 4/1992 | Bakanowsky, III ............... 248/442.2 |
| 5,251,766 | * | 10/1993 | Barry ................................ 211/89 |
| 5,301,915 | * | 4/1994 | Bahniuk et al. .............. 248/442.2 X |
| 5,678,792 | * | 10/1997 | Arguin et al. ................ 248/442.2 X |

* cited by examiner

Primary Examiner—Derek J. Berger

(57) ABSTRACT

An elongate note holder for paper and the like which is mounted to the topside or lateral side of a CRT computer monitor 21 which serves as a retainer to vertically display notes and the like so that the user may easily insert the notes into the holder and make ready reference to the information contained on the note and then easily remove the note after the use is completed. The note holder is an elongate structure with a socket 10 with generally the cross-sectional shape of the letter U encasing two adjacent tubular resilient members 12 and thus forming three grooves for holding notes along the length of socket 10. The multiple groove design multiplies the number of notes that may be individually organized and manipulated without having to bunch unrelated notes together after the length of the first groove is filled with notes. Socket 10 is comprised of two parallel lateral walls 10A connected by base wall 10B. Base wall 10B is substantially perpendicular to the paper being held and is the wall used to mount the note holder to the topside or lateral side of a computer monitor.

1 Claim, 4 Drawing Sheets

NOTE PAPER HOLDER

BACKGROUND: FIELD OF INVENTION

This invention relates to a holder of paper notes and the like which may be attached to the lateral side or topside of a CRT computer monitor or other flat surface to serve as a retainer to display and store notes and the like so that the user of the device may easily insert paper into the holder and make ready reference to the information on the paper and then easily remove the paper after the use is completed.

BACKGROUND: DISCUSSION OF PRIOR ART

Many office workers spend a considerable amount of time using small paper notes, messages, memos etc. There is often a tendency for numerous of these notes to be present simultaneously and create desktop clutter and disorganization for the office worker. Millions of office personnel use computer monitors of the cathode ray tube (CRT) type at their workstations. The present invention takes the flat unused surfaces on the topside and lateral side of CRT computer monitors and equips them with a device to hold and display the numerous small paper notes and memos that otherwise tend to create clutter and disorganization on desktop surfaces. Heretofore, no one has utilized the elongate flat unused areas on the lateral sides and topside of a computer monitor with a correspondingly elongate flat surface mounted note holder with low profile lines and able to releasably hold and display a plurality of small paper notes adjacent to each other so that the user can individually manipulate one note without disturbing other notes adjacently held.

There are a number of copy holding devices for use on computer monitors. Most of these types are of the nature of an arm or planar structure which protrude far from the perimeter from the monitor to form a rigid platform or structure to brace the paper and then to clamp the paper with a clamping devices such as a spring clip or a gravity activated roller. This type of device is common and useful for holding standard 8½"×11" office paper. This type of device is not useful for holding a multiplicity of smaller paper notes for simultaneous visual display. For example, releasing the spring clip will release all the notes instead of just one. Gravity activated rollers are similarly cumbersome when trying to individually segregate and manipulate one of a number of small notes.

There are a number of elongate resilient note holders with some similarity to the present invention. All are lacking two important features of the present invention. They are all designed to be mounted to an exterior surface on the backside of the holder which is a surface parallel to the plane at which the paper is held. This mounting surface is on the wall of the holder opposite and substantially parallel to the gripping or bearing surface wall. As a result, these devices are not able to be used on the topside or lateral side of a computer monitor. Second, there is only one groove for receiving paper. Thus, after the length of the single groove is used, additional notes can only be held by bunching them with other notes, often unrelated, instead of having another groove along the length of the channel to individually hold and manipulate the note.

U.S. Pat. No. 4,010,517 by Odd B. Kapstad issued Mar. 8, 1977 represents an elongate, rigid channel with a leaf spring which cooperates with a shoulder on one wall member to anchor the sheet in the cavity. This design, like all other elongate resilient holders, only has a single groove to hold paper. U.S. Pat. No. 4,629,075 by James E. Hutten issued Dec. 16, 1986 and U.S. Pat. No. 4,773,545 by Graham R. Jones issued Sep. 27, 1988 have resilient members with similar geometry to Kapstad's leaf spring design, that is, they form only one groove for the insertion of paper. U.S. Pat. No. 5,251,766 by James A Barry issued Oct. 12, 1993, represents an elongate sheet material holder with a brush strip instead of a sheet-like resilient member as used by Kapstad, Hutten, and Jones.

All of the above resilient designs anchor the resilient member from a wall parallel to the bearing wall where the paper note is clamped by the resilient member. Kapstad, Hutten, Jones, and Barry all mount to an exterior surface at an angle that is substantially parallel and not at a 90 degree angle to the paper being held.

OBJECTS AND ADVANTAGES

Accordingly, several of the objects and advantages of our sheet material holder are:

(a) to provide an elongate note holder that mounts to the flat surfaces on the lateral side and/or top side of a CRT computer monitor.

(b) to provide a note holder low in profile and matches the contour of a CRT computer monitor and does not protrude excessively beyond the side perimeter.

(c) to provide a note holder that easily and conveniently holds one or more paper notes, memos, or cards in a vertical plane that are quickly and easily inserted and securely held for display and reference for the user and then easily removed when the use is completed without disturbing notes adjacently held.

(d) to provide a note holder where the resilient member is attached to the base wall which is substantially perpindicular to the bearing wall where the note is held.

(e) to provide a note holder with one or more an arched resilient members across the elongate open side end of the holder which creates a multiplicity of holding grooves and thus multiplies the number of individual small paper notes that can be individually segregated and manipulated without disturbing adjacent notes or requiring bunching together a multiplicity of unrelated notes after the length of the first groove has been filled.

(f) to provide a note holder that is made of transparent plastic so that writing on the edge region of the paper can be seen inside the note holder.

(g) to provide a note holder that is inexpensive to manufacture and is affordable to the public. Because of the simplicity of the design, this invention can be manufactured with a minimal of manufacturing steps. All or most of the invention can be made of plastic that is readily available. Material and labor costs will be low per unit thus enabling this note holder to be very affordable to the public.

Still further objects and advantages will become apparent from a consideration of the ensuing description and drawings.

Figure 1:
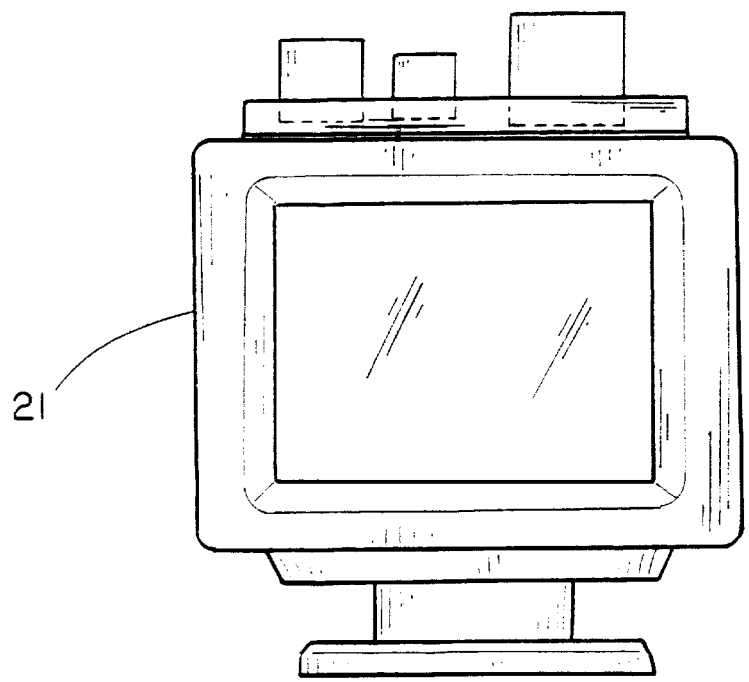
FIG. 1 shows a frontal perspective view of invention holding paper notes and mounted to the topside and lateral side a CRT computer monitor.

REFERENCE NUMERALS IN DRAWINGS 10 socket
10A lateral wall
10B base wall
10C cradle
10D notch for clip
10E retaining structure for double arched resilient member
10F retaining structure for single arched resilient member
11 attaching mechanism for computer monitor
12 resilient member
12A crease in resilient member
14 groove
15 attaching mechanism for wall mount
16 clip
20 elongate note holder for CRT computer monitor
21 CRT computer monitor

DESCRIPTION OF THE PREFERRED EMBODIMENTS

Figure 2:
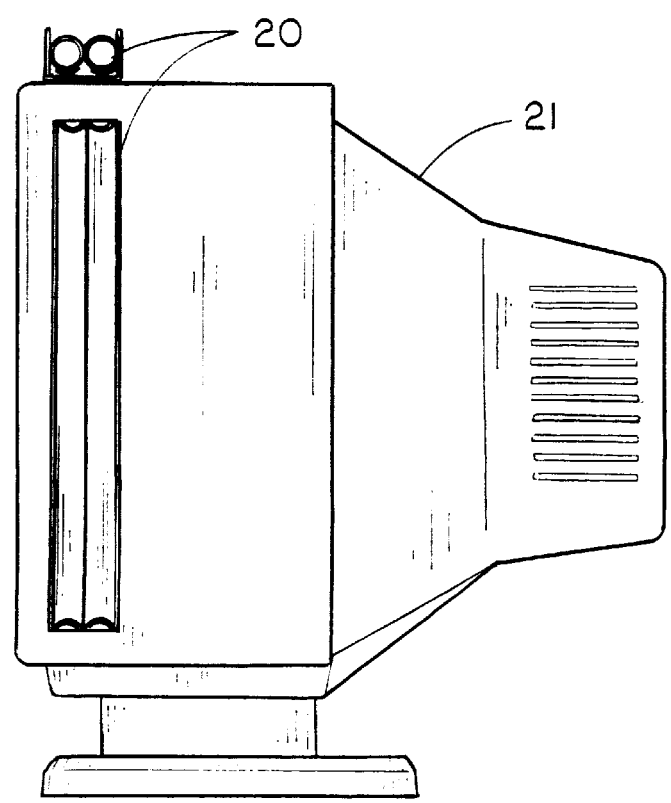
FIG. 2 shows a lateral perspective view of invention mounted to the topside and lateral side of a CRT computer monitor.
Figure 3:
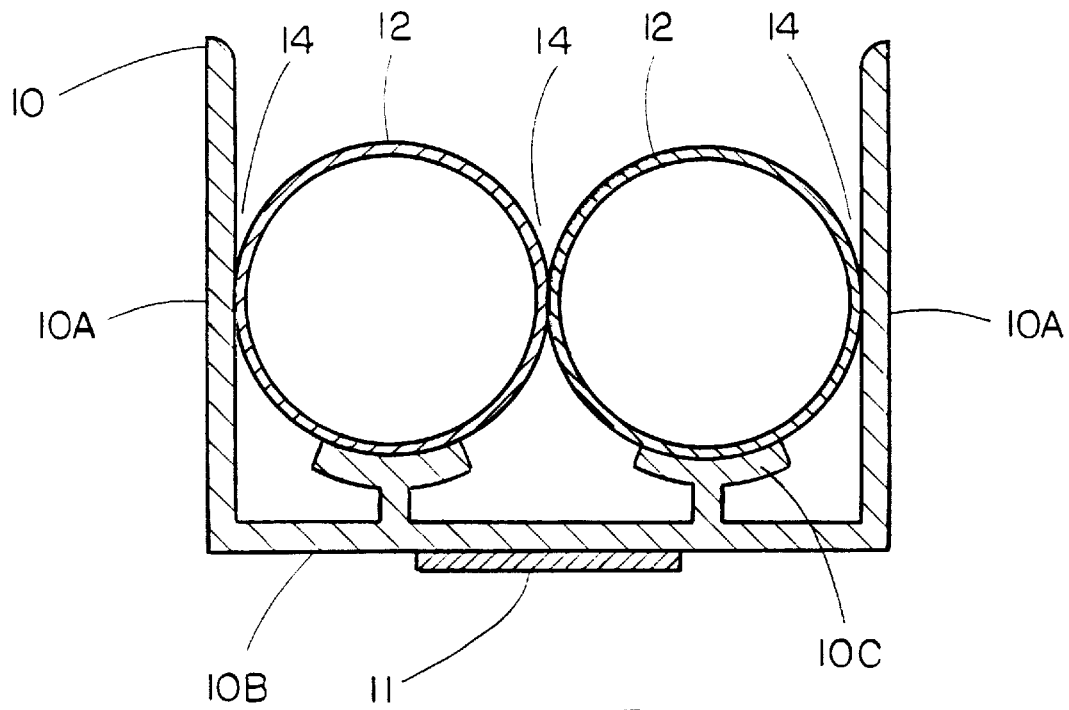
FIG. 3 shows a cross-sectional view of the preferred embodiment with the resilient members glued to the socket.
Figure 4:
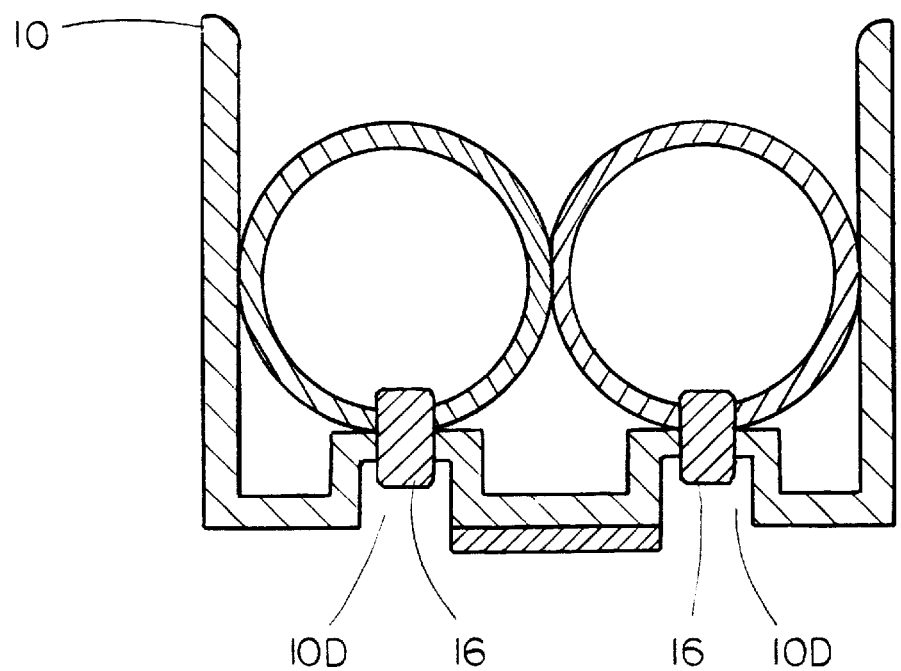
FIG. 4 shows a cross-sectional view of the preferred embodiment with the resilient members clipped to the socket.

A typical and preferred embodiment of the present invention is illustrated in FIGS. 1, 2, 3, and 4. FIGS. 1 and 2 are frontal and lateral perspective views of invention mounted to a CRT computer monitor. FIGS. 3 & 4 are cross-sectional views.

Figure 6:
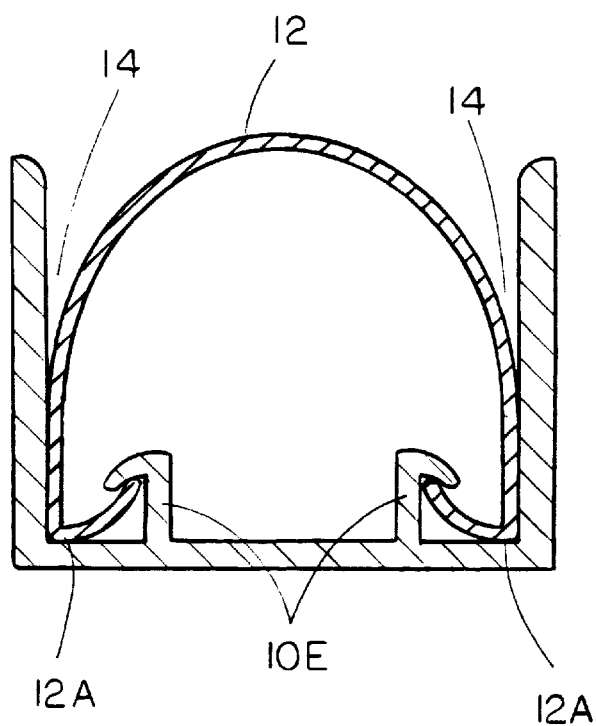
FIG. 6 shows a cross-sectional view of an alternate embodiment of the multiple groove with single arch resilient member and wall mount.

The invention is comprised of an elongate, rigid structure or a socket 10 which encases one or more elongate resilient members 12. Resilient member 12 forms an arch-like shape across the width of the elongate open end of socket 10. FIG. 6 shows a single resilient member 12 used to span the width of socket 10. Each side of resilient member 12 forms a groove 14 as it bears against the inside lateral wall 10A.

In the preferred embodiment, resilient member 12 has a double arch span across the width of socket 10. By using a double arch, an additional groove 14 for paper holding is created between the arches as the arches press against each other. The width of this middle groove is twice the width of the grooves created by the resilient member 12 against the inside lateral wall 10A.

In the preferred embodiment, socket 10 has the cross-sectional shape of the letter U with two resilient members 12 connected thereto. There are two versions of the preferred embodiment as depicted in FIGS. 3 and 4. The versions differ only in the mechanism whereby resilient member 12 is attached to socket 10 via base wall 10B. In FIG. 3, each resilient member 12 is attached to socket 10 at a cradle 10C on the base wall 10B. Cradle 10C has a complementary curvature as resilient member 12 which provides a gluing surface and maintains the curvature of resilient member 12.

FIG. 4 shows the preferred embodiment whereby resilient members 12 are attached to base wall 10B with clip 16. Base wall 10B has a notch 10D to accommodate clip 16.

Resilient members 12 are tubular and have a cross-sectional shape that is circular or slightly oval and are made of very thin polyester film. The film has a thickness of about $3/1000$'s of an inch. The polyester tubes are pre-formed and are made in much the same way as paper tubes are made with a spiraling technique.

Figure 5:
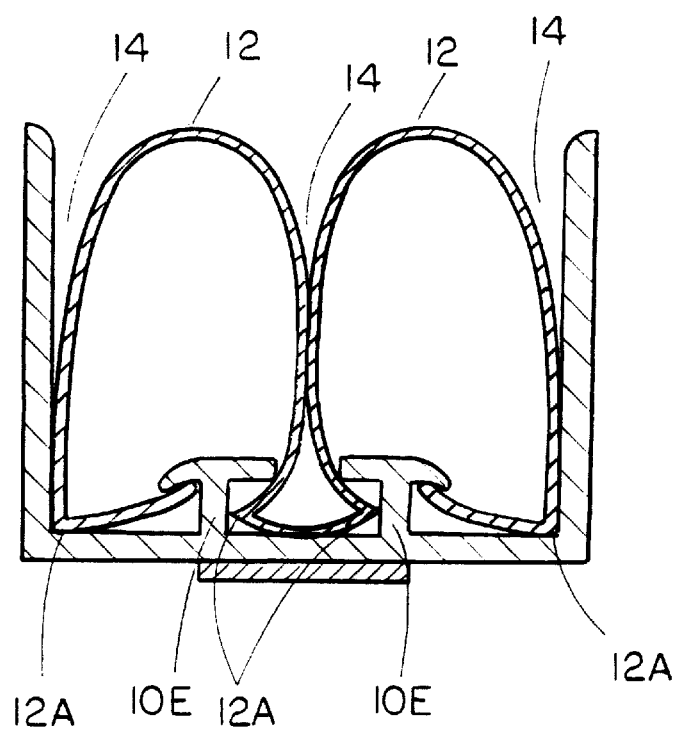
FIG. 5 shows a cross-sectional view of an alternate embodiment of the multiple groove design formed with double arch one piece resilient material.

FIGS. 5 and 6 show alternate embodiments for resilient member 12. Resilient member 12 has scores or creases 12A which are used in conjunction with retaining structures 10E and 10F to hold resilient member 12 to base wall 10B without the necessity of gluing.

Figure 7:
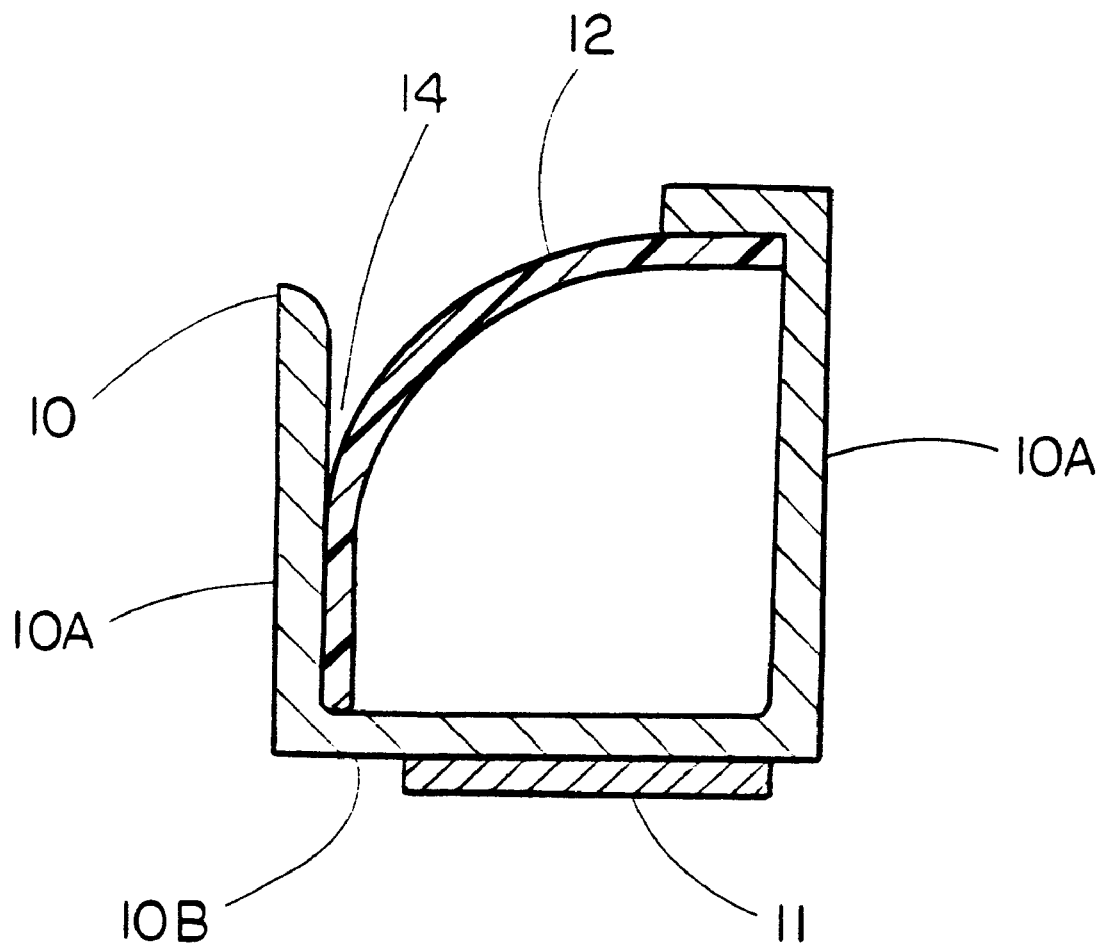
FIG. 7 shows a cross-sectional view of an alternate embodiment with a single groove and equipped to mount on a CRT computer monitor.

FIG. 7 shows the most basic version of the CRT computer monitor note holder. In this embodiment, there is a single groove for inserting paper notes.

The attaching mechanism for a CRT computer monitor 11 is located on the outside of base wall 10B. Base wall 10B is substantially perpendicular to the angle at which notes are held. The preferred medium for attachment is two-sided foam tape.

Socket 10 is typically made of transparent plastic by either extrusion or injection molding.

The word "film" is defined in this invention as a very thin sheet of smooth, elastic, and flexible plastic. The best kind of film to use is a polyester film with a thickness of about $3/1000$ of an inch. Other thickness gauges can also work. Its physical properties of strength, flexibility, and creep make it superior to all other types of film material in this application. The properties of the film material are such that it is flexible, elastic, and transparent. Flexibility is important so that it will easily bend when contacted by the force of an edge of paper. If the film material is not flexible enough, the edge of paper may bend and be damaged and fail to enter the holder. Elasticity is important in creating the gripping spring force to sandwich the sheet material between resilient member 12 and the inside lateral wall of socket 10A or between two adjacent resilient members 12.

Operation

The user mounts base wall 10B with two sided foam tape or other suitable medium to the lateral side or topside of a CRT computer monitor. By mounting the tape to a lateral wall, the note holder can be mounted to wall or other flat surface.

With the preferred embodiment, three grooves 14 are available for note holding along the length of the note holder. If the front groove is full of notes, the user has two additional grooves to hold and individually manipulate the notes without having to bunch unrelated notes together. This is a substantial time and organizational savings over other note holders.

Socket 10 is dimensionally configured to hold resilient member 12 with some tension on the surfaces that touch inside lateral wall 10A or another resilient member 12. In any event, resilient member 12 must be closer than the thickness of ordinary writing paper to inside lateral wall 10A or another resilient member 12.

Conclusions, Ramifications, and Scope of Invention

CRT computer monitors are ubiquitous in the work place and also at home. Small paper notes are often used at the workstation in conjunction with computers or in addition to them. Messages, memos, business cards, index cards, computer program prompter notes and others are part of the plethora of paper notes that can easily clutter an already crowded desk top or workstation. Heretofore, no one has designed an elongate note holder for the flat surfaces on the topside and lateral side of a computer monitor.

The are also suitable flat surfaces around the screen where a note holder could be mounted on the outside lateral wall 10A but this location would not be aesthetically pleasing. If space did not allow a lateral side or topside mount however, a front surface mount would work well. If the note holder is mounted perpendicular to the ground on the lateral side of the CRT monitor, it is capable of holding 8½"×11" paper straight enough for reading.

Office workers without CRT computer monitors will find the present invention useful for mounting on a wall or other flat surface by mounting on the outside lateral wall 10A with two sided foam tape, hook and loop fasteners or a magnetic strip.

Although the description above contains many specificities, these should not be construed as limiting the scope of the invention but merely as providing illustrations of some of the presently preferred embodiments of this invention. Thus the scope of the invention should be determined by the appended claims and their legal equivalents, rather than by the examples given.

We claim:

1. An elongate note holder for a CRT computer monitor comprises:

a generally square U-shaped channel having a base wall and two side walls connected thereto, said side walls extending generally parallel with one another outwards from said base wall, said side walls being substantially transparent and each having outer edges;

CRT monitor mounting means mounted on said base wall whereby said note holder is removably mountable on a CRT monitor;

a generally cylindrical, flexible and resilient securement tube having an outer surface, said securement tube mounted on said base wall within said channel, said securement tube extending axially generally parallel with said side walls of said channel with at least a section of said outer surface of said tube resiliently contacting the inner walls of said side walls along the length of said securement tube, said securement tube being a closed cylinder such that said outer surface is continuous; and said securement tube and said channel adapted to releasably secure sheet material between said securement tube and at least one of said side walls of said channel when said sheet material is inserted between said outer surface of said securement tube and said inner wall of one of said side walls where said outer surface of said tube resiliently contacts said inner wall, said securement tube being resiliently deformable thereby to releasably secure said sheet material between said outer surface of said securement tube and said inner wall of one of said side walls.

* * * * *